(12) United States Patent
Kim et al.

(10) Patent No.: US 8,344,075 B2
(45) Date of Patent: Jan. 1, 2013

(54) HYBRID SILOXANE POLYMER, ENCAPSULANT OBTAINED FROM THE SILOXANE POLYMER, AND ELECTRONIC DEVICE INCLUDING THE ENCAPSULANT

(75) Inventors: Woo-Han Kim, Kumi (KR); June-Ho Shin, Kumi (KR); Sang-Ran Koh, Kumi (KR); Sung-Hwan Cha, Kumi (KR); Hyun-Jung Ahn, Kumi (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/182,726

(22) Filed: Jul. 14, 2011

(65) Prior Publication Data
US 2012/0016083 A1 Jan. 19, 2012

(30) Foreign Application Priority Data
Jul. 14, 2010 (KR) .................. 10-2010-0068143

(51) Int. Cl.
*C08L 83/07* (2006.01)
(52) U.S. Cl. ............ 525/477; 525/478; 528/15; 528/31; 528/32; 528/43; 428/447
(58) Field of Classification Search .................. None
See application file for complete search history.

(56) References Cited

U.S. PATENT DOCUMENTS

| | | | |
|---|---|---|---|
| 5,578,380 A * | 11/1996 | Babu ............. | 428/447 |
| 5,681,808 A * | 10/1997 | Kobayashi et al. ....... | 510/511 |
| 6,613,834 B2 * | 9/2003 | Nakata et al. .......... | 524/588 |
| 7,407,992 B2 * | 8/2008 | Liao ............... | 523/106 |
| 2006/0275617 A1 | 12/2006 | Miyoshi et al. | |
| 2009/0281243 A1 | 11/2009 | Takanashi et al. | |

FOREIGN PATENT DOCUMENTS

| | | |
|---|---|---|
| JP | 63-235367 | 9/1988 |
| JP | 04-089866 | 3/1992 |
| JP | 05-271552 | 10/1993 |
| JP | 09-048916 | 2/1997 |
| JP | 2006-213789 | 8/2006 |
| JP | 2008-069210 | 3/2008 |
| KR | 10-2006-0016107 A | 2/2006 |
| KR | 10-2007-0097075 A | 10/2007 |

OTHER PUBLICATIONS

European Search Report in EP 11173855.5-1214, dated Nov. 15, 2011 (Kim, et al.).

* cited by examiner

*Primary Examiner* — Marc Zimmer
(74) *Attorney, Agent, or Firm* — Lee & Morse, P.C.

(57) ABSTRACT

A hybrid siloxane polymer, an encapsulant, and an electronic device, the hybrid siloxane polymer including a linear first siloxane resin including moieties represented by the following Chemical Formulas 1a and 1b, the first siloxane resin including double bonds at both terminal ends thereof, and a second siloxane resin having a reticular structure:

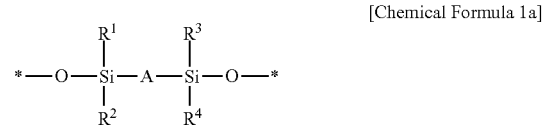

[Chemical Formula 1a]

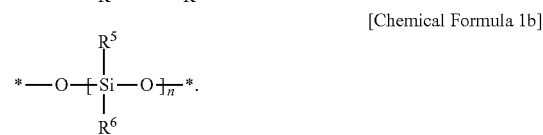

[Chemical Formula 1b]

13 Claims, No Drawings

HYBRID SILOXANE POLYMER, ENCAPSULANT OBTAINED FROM THE SILOXANE POLYMER, AND ELECTRONIC DEVICE INCLUDING THE ENCAPSULANT

BACKGROUND

1. Field

Embodiments relate to a hybrid siloxane polymer, an encapsulant obtained from the hybrid siloxane polymer, and an electronic device including the encapsulant.

2. Description of the Related Art

A light emitting element, e.g., a light emitting diode (LED), an organic light emitting diode (OLED), a photoluminescent (PL) device, and the like, has been variously used in, e.g., a domestic electric device, a lighting device, a display device, various automatic devices, and the like. The light emitting element may display intrinsic colors of a light emitting material, e.g., blue, red, and green, using a light emitter, or white by combining light emitters displaying different colors. The light emitting element may include a packaging or encapsulation structure. The packaging or encapsulation structure may be made of an encapsulant including a transparent resin (being able to externally pass light emitted from a light emitting element). The encapsulant may be located in a position where light passes. Accordingly, it may be desirable to have heat and light resistance.

SUMMARY

Embodiments are directed to a hybrid siloxane polymer, an encapsulant obtained from the hybrid siloxane polymer, and an electronic device including the encapsulant.

The embodiments may be realized by providing a hybrid siloxane polymer, including a linear first siloxane resin including moieties represented by the following Chemical Formulas 1a and 1b, the first siloxane resin including double bonds at both terminal ends thereof, and a second siloxane resin having a reticular structure,

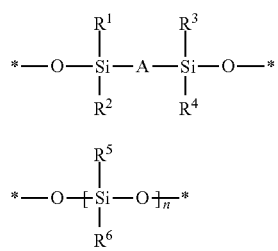

[Chemical Formula 1a]

[Chemical Formula 1b]

wherein, in Chemical Formula 1a and 1b, A is a C2 to C10 alkylene group, $R^1$ to $R^6$ are each independently a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof, and n is 1 to about 500.

The second siloxane resin may be represented by the following Chemical Formula 2:

$$[R^7SiO_{3/2}]_T[R^8R^9SiO]_D[R^{10}R^{11}R^{12}SiO_{1/2}]_M$$ [Chemical Formula 2]

wherein, in Chemical Formula 2, $R^7$ to $R^{12}$ are each independently a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof, provided that at least one of $R^{10}$, $R^{11}$, and $R^{12}$ is the C2 to C20 alkenyl group, T>0, D≧0, M>0, and T+D+M=1.

About 15% or more of $R^7$ to $R^{12}$ in Chemical Formula 2 include an aryl group.

About 30% or more of $R^5$ and $R^6$ in Chemical Formula 1b include an aryl group.

The first siloxane resin may further include a moiety represented by the following Chemical Formula 1c:

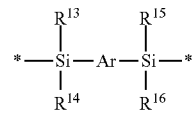

[Chemical Formula 1c]

wherein, in Chemical Formula 1c, Ar is a substituted or unsubstituted C6 to C20 aryl group, $R^{13}$ to $R^{16}$ are each independently a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof.

A of the first siloxane resin may be one of an ethylene group, a propylene group, a butylene group, and a pentylene group.

The first siloxane resin may have a number average molecular weight of about 500 to about 20,000.

The first siloxane resin and the second siloxane resin may be included in an amount of about 5 to about 50 wt % and about 15 to about 80 wt %, respectively, based on a total amount of the hybrid siloxane polymer.

The hybrid siloxane polymer may further include a curing agent, the curing agent having at least two silicon-hydrogen bonds.

The hybrid siloxane polymer may further include a hydrosilation catalyst.

The embodiments may also be realized by providing an encapsulant obtained by curing the hybrid siloxane polymer of an embodiment.

The embodiments may also be realized by providing an electronic device including the encapsulant of an embodiment.

The electronic device may include a light emitting diode, an organic light emitting device, photoluminescent device, or a solar cell encapsulated by the encapsulant

DETAILED DESCRIPTION

Korean Patent Application No. 10-2010-0068143, filed on Jul. 14, 2010, in the Korean Intellectual Property Office, and entitled: "Hybrid Siloxane Polymer, Encapsulant Obtained from the Siloxane Polymer, and Electronic Device Including the Encapsulant," is incorporated by reference herein in its entirety.

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present.

As used herein, when a definition is not otherwise provided, the term "substituted" may refer to one substituted with one of a halogen (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, an alkyl group, a C2 to C16 alkenyl group, a C2 to C16 alkynyl group, a C6 to C30 aryl group, a C7 to C13 arylalkyl group, a C1 to C4 oxyalkyl group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a heterocycloalkyl group, and a combination thereof, instead of hydrogen.

As used herein, when a definition is not otherwise provided, the term "hetero" may refer to one including 1 to 3 heteroatoms, e.g., N, O, S, and P.

Hereinafter, a hybrid siloxane polymer according to an embodiment is described.

The hybrid siloxane polymer according to an embodiment may include a first siloxane resin having a linear structure and a second siloxane resin having a reticular structure.

The first siloxane resin may include moieties represented by the following Chemical Formulae 1a and 1b.

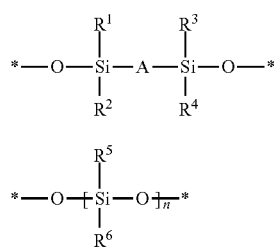

[Chemical Formula 1a]

[Chemical Formula 1b]

In Chemical Formulae 1a and 1b, A may be a C2 to C10 alkylene group, $R^1$ to $R^6$ may each independently be a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof, and n may be 1 to about 500. * may represent a bond to O, Si, and/or C.

The moiety represented by the above Chemical Formula 1a may structurally include a linear bridge hydrocarbon (A) linking between two silicon atoms. Such a structure may remarkably decrease surface tackiness during processing. Accordingly, the siloxane resin may maintain a low coefficient of thermal expansion (CTE) and a low modulus. Thus, crack resistance and interface adherences may be increased.

In an implementation, the linear bridge hydrocarbon (A) may include a C2 to C5 alkylene group, e.g., an ethylene group, a propylene group, a butylene group, and/or a pentylene group. In another implementation, the linear bridge hydrocarbon (A) may include a C2 or C3 alkylene group, e.g., an ethylene group and/or a propylene group.

The moiety represented by the above Chemical Formula 1b may be a siloxane moiety with a silicon-oxygen-silicon bond.

The moiety represented by the above Chemical Formula 1b may include a substituent combined with silicon, that is, $R^5$ and $R^6$ may include at least 30% of an aryl group. When the moiety includes an aryl group within the range, it may bring about a high refractive index.

In the above Chemical Formula 1b, n does not indicate a polymerization degree but the total number of the moiety [$R^5R^6SiO$—], comprised in the hybrid siloxane polymer, particularly in Chemical Formula 1b, when the moieties represented by Chemical Formulae 1a and 1b are included more than one. n may be 1 to 500.

The first siloxane resin may include carbon-carbon double bonds at terminal ends thereof, the carbon-carbon double bonds being capable of undergoing a hydrosilation reaction. Herein, as expressed in the following Chemical Formula a, it is preferable that one carbon of the carbon-carbon double bond be directly linked or bonded to a silicon atom.

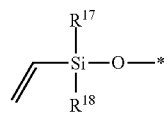

[Chemical Formula a]

In Chemical Formula a, $R^{17}$ and $R^{18}$ may each independently be a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof.

Thus, the first siloxane resin may have a linear structure with carbon-carbon double bonds at terminal ends thereof and may undergo a hydrosilation reaction at a level or rate equivalent to a second siloxane resin having a reticular structure.

If the first siloxane resin having a linear structure were to undergo the hydrosilation reaction at a sharply reduced rate compared with a second siloxane resin (having a three-dimensional reticular structure), the second siloxane resin having a three-dimensional reticular structure may be cured first, thereby forming a region with a low coefficient of thermal expansion and high modulus. Then, the first siloxane resin having a linear structure may be cured, resulting in poor crack resistance and interface adherence of a final product. Thus, according to the embodiments, the first siloxane resin having a linear structure may undergo the hydrosilation reaction at a rate equivalent to the second siloxane resin (having a three-dimensional reticular structure), thereby preventing deterioration of crack resistance and interface adherence.

The first siloxane resin may have a number average molecular weight of about 500 to about 20,000.

The first siloxane resin may be included in an amount of about 5 wt % to about 50 wt %, based on an entire amount or weight of the hybrid siloxane polymer. Maintaining the amount of the first siloxane resin within this range may help maintain hardness of the hybrid siloxane polymer after the curing and may help maintain modulus within an appropriate range, thereby improving crack resistance.

The first siloxane resin may be prepared according to the methods described below.

In an implementation, the first siloxane resin may be prepared by hydrosilylating a siloxane compound having two carbon-carbon double bonds with a siloxane compound having two silicon-hydrogen bonds.

For example, a siloxane resin including a moiety represented by the following Chemical Formula e may be prepared by hydrosilylating a siloxane compound having two silicon-hydrogen bonds (represented by the following Chemical Formula b) with a siloxane compound having two carbon-carbon double bonds (represented by the following Chemical Formula c or d).

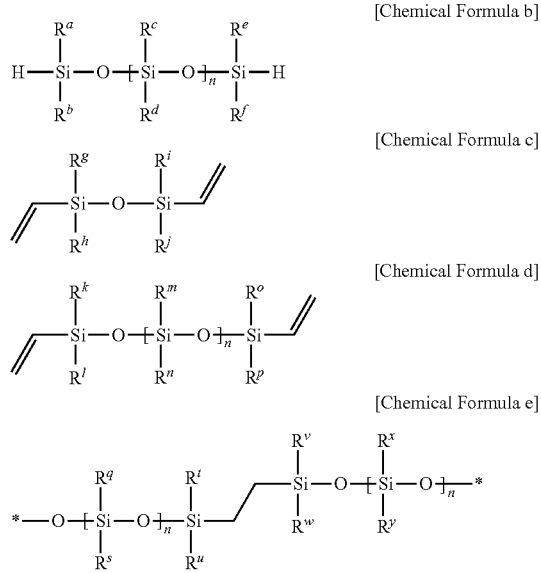

In Chemical Formulae b to e, $R^a$ to $R^y$ may each independently be a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof, and n may be 1 to about 500.

A compound having two silicon-hydrogen bonds while having an aryl group linked or bonded between silicon atoms may be used instead of a siloxane compound.

The compound including an aryl group between silicon atoms may be a compound represented by the following Chemical Formula f or g.

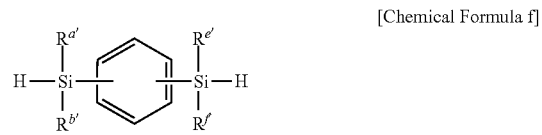

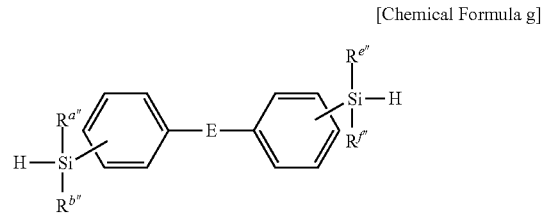

In Chemical Formulae f and g, E may be a single bond, oxygen, a sulfonyl group, a C1 to C10 alkylene group, a hexafluoropropylene group, or a combination thereof, $R^{a'}$, $R^{b'}$, $R^{e'}$, $R^{a''}$, $R^{b''}$, $R^{e''}$, and $R^{f''}$ may each independently be a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof.

Thus, the first siloxane resin may include a moiety represented by the following Chemical Formula 1c.

In Chemical Formula 1c, Ar may be a substituted or unsubstituted C6 to C20 aryl group, and $R^{13}$ to $R^{16}$ may each independently be a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof.

In another implementation, the first siloxane resin may be prepared by first hydrosilylating a siloxane compound having two carbon-carbon double bonds with a silane compound and then cohydrolyzing the resulting product with a dichloroalkylsilane or dichloroarylsilane compound.

In still another implementation, the first siloxane resin may be prepared by cohydrolyzing a compound including an alkylene group between two silicon atoms with a silane compound.

The second siloxane resin may be a compound represented by the following Chemical Formula 2.

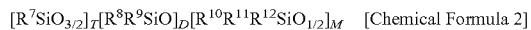

[Chemical Formula 2]

In Chemical Formula 2, $R^7$ to $R^{12}$ may each independently be a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof. In an implementation, at least one of $R^{10}$, $R^{11}$, and $R^{12}$ may be an alkenyl group. In addition, T, D, and M may satisfy the relations: T>0, D≧0, M>0 and T+D+M=1.

In the above Chemical Formula 2, at least about 15% of $R^7$ to $R^{12}$ may include an aryl group.

The second siloxane resin may play a role of determining hardness when the hybrid siloxane polymer is cured.

The second siloxane resin may be included in an amount of about 15 wt % to about 80 wt %, based on the entire amount or weight of the hybrid siloxane polymer. When the second siloxane resin is included within this amount, hardness of a hybrid siloxane polymer after the curing may be appropriately maintained.

The hybrid siloxane polymer may further include a curing agent. The curing agent may be a compound including two silicon-hydrogen bonds at terminal ends thereof.

The silicon-hydrogen bond of a curing agent may be included in a ratio of about 0.5 to about 2.0 mols per 1 mol of a double bond included in the first and second siloxane resins. Maintaining the amount of the silicon-hydrogen bond within this range may help ensure a sufficient curing degree of a hybrid siloxane polymer during the curing, and may simultaneously prevent oxidation or discoloring of the cured product due to non-reacted hydrogen-silicon bonds.

The curing agent may be included in an amount of about 15 to about 40 wt %, based on the entire amount or weight of the hybrid siloxane polymer. Maintaining the amount of the curing agent within the range may help maintain hardness of a hybrid siloxane polymer after the curing.

The hybrid siloxane polymer may further include a hydrosilation catalyst other than the aforementioned first and second siloxane resins.

The hydrosilation catalyst may be a catalyst including, e.g., platinum, rhodium, palladium, ruthenium, iridium, osmium, or a combination thereof, as a central metal. For example, the hydrosilation catalyst may be a Karstedt catalyst prepared through reaction of chloroplatinic acid and 1,3-divinyl-1,1,3,3-tetramethoxysiloxane. The hydrosilation catalyst may be included in an amount of about 0.1 ppm to about 1,000 ppm, based on the total amount of the hybrid siloxane polymer.

The aforementioned hybrid siloxane polymer may be cured, and thus may be used as an encapsulant for an electronic device. The electronic device may include, e.g., a light emitting diode, an organic light emitting device, a photoluminescent device, and a solar cell, but is not limited thereto.

The encapsulant prepared from the hybrid siloxane polymer may exhibit heat and light resistance, and thus may decrease a coefficient of thermal expansion as well as secure high transmittance and a high refractive index, thereby improving crack resistance and adherence. In addition, it may decrease generation of oligomers having a low molecular weight during the manufacturing process of a siloxane resin, and thus may decrease tackiness on the surface, improving workability.

The following Examples illustrate the embodiments in more detail. However, they are exemplary embodiments of the present invention and are not limiting. Moreover, the Comparative Example is set forth to highlight certain characteristics of certain embodiments and are not to be construed as either limiting the scope of the invention as exemplified in the Examples or as necessarily always being outside the scope of the invention in every respect.

Synthesis of a First Siloxane Resin

Synthesis Example 1

205.04 g (1.1 mol) of 1,3-divinyl-1,1,3,3-tetramethyl disiloxane was added to 600 g of toluene in a four-necked flask with an agitator, a temperature controller, a nitrogen gas-injecting device, and a cooler, while nitrogen was flowed therethrough and dissolved therein. Herein, a small amount of PS-CS-1.8CS (Unicore) was added thereto and continuously stirred. Next, a solution prepared by dissolving 332 g (1 mol) of 3,3-diphenyl-1,1,5,5-tetramethyltrisiloxane in 600 g of toluene was slowly added dropwise into the above solution for about 30 minutes. Then, the reaction solution was heated for reflux for 24 hours. The resulting reaction solution was passed through a 5 cm-thick silica gel column to remove a platinum complex. Its solvent was removed under reduced pressure distillation, preparing a first linear siloxane resin with a number average molecular weight of 8,000. When the modified siloxane polymer was analyzed using a gel permeation chromatography (GPC), oligomers having a low molecular weight (less than 500) were not present.

Synthesis Example 2

A siloxane resin was prepared according to the same method as in Synthesis Example 1, except for using 423.2 g (1.1 mol) of 3,3-diphenyl-1,5-divinyl-1,1,5,5-tetramethyltrisiloxane instead of 1,3-divinyl-1,1,3,3-tetramethyl disiloxane. The siloxane resin had a number average molecular weight of 9,700. When the modified siloxane polymer was analyzed using a gel permeation chromatography (GPC), oligomers having a low molecular weight (less than 500) were not present.

Synthesis Example 3

A siloxane resin was prepared according to the same method as in Synthesis Example 1, except for using 442.41 g (1.15 mol) of 3,3-diphenyl-1,5-divinyl-1,1,5,5-tetramethyltrisiloxane instead of 1,3-divinyl-1,1,3,3-tetramethyl disiloxane. The siloxane resin turned out to be a first linear siloxane resin A-2 with a number average molecular weight of 6,700. When the modified siloxane polymer was analyzed using a gel permeation chromatography (GPC), oligomers having a low molecular weight (less than 500) were not present.

Preparation of a Hybrid Siloxane Polymer

Example 1

A hybrid siloxane polymer was prepared by mixing 2.56 g of the first siloxane resin according to Synthesis Example 1, 5 g of a second siloxane resin represented by the following Chemical Formula 2a, 1 g of 3,3-diphenyl-1,1,5,5-tetramethyltrisiloxane, and 3 ppm of PS-CS-1.8CS (Unicore).

$$(Me_2ViSiO_{1/2})_{0.15}(PhSiO_{3/2})_{0.85}$$ [Chemical Formula 2a]

In the hybrid siloxane polymer, a hydrogen/vinyl group (H/Vi) was included in a ratio of 1.1:1.

Example 2

A hybrid siloxane polymer was prepared by mixing 1.11 g of the first siloxane resin according to Synthesis Example 1, 5.3 g of a second siloxane resin represented by Chemical Formula 2a, 1 g of 3,3-diphenyl-1,1,5,5-tetramethyltrisiloxane, and 3 ppm of PS-CS-1.8CS (Unicore).

In the hybrid siloxane polymer, a hydrogen/vinyl group (H/Vi) was included in a ratio of 1.1:1.

Example 3

A hybrid siloxane polymer was prepared by mixing 3.11 g of the first siloxane resin according to Synthesis Example 2, 5 g of a second siloxane resin represented by Chemical Formula 2a, 1 g of 3,3-diphenyl-1,1,5,5-tetramethyltrisiloxane, and 3 ppm of PS-CS-1.8CS (Unicore).

In the hybrid siloxane polymer, a hydrogen/vinyl group (H/Vi) was included in a ratio of 1.1:1.

Example 4

A hybrid siloxane polymer was prepared by mixing 1.34 g of the first siloxane resin according to Synthesis Example 2, 5.3 g of a second siloxane resin represented by Chemical Formula 2a, 1 g of 3,3-diphenyl-1,1,5,5-tetramethyltrisiloxane, and 3 ppm of PS-CS-1.8CS (Unicore).

In the hybrid siloxane polymer, a hydrogen/vinyl group (H/Vi) was included in a ratio of 1.1:1.

Example 5

A hybrid siloxane polymer was prepared by mixing 2.14 g of the first siloxane resin obtained in Synthesis Example 3, 5 g of a second siloxane resin represented by Chemical Formula 2a, 1 g of 3,3-diphenyl-1,1,5,5-tetramethyltrisiloxane, and 3 ppm of PS-CS-1.8CS (Unicore). In the hybrid siloxane polymer, a hydrogen/vinyl group (H/Vi) was included in a ratio of 1.1:1.

Example 6

0.93 g of the first siloxane resin obtained in Synthesis Example 3, 5.3 g of the second siloxane resin represented by Chemical Formula 2a, 1 g of 3,3-diphenyl-1,1,5,5-tetramethyltrisiloxane, and 3 ppm of PS-CS-1.8CS (Unicore).

In the hybrid siloxane polymer, a hydrogen/vinyl group (H/Vi) was included in a ratio of 1.1:1.

Comparative Example

A hybrid siloxane polymer was prepared by mixing 1.60 g of a siloxane resin represented by the following Chemical Formula 5, 5 g of a second siloxane resin represented by Chemical Formula 2a, 1 g of 3,3-diphenyl-1,1,5,5-tetramethyltrisiloxane, and 3 ppm of PS-CS-1.8CS (Unicore).

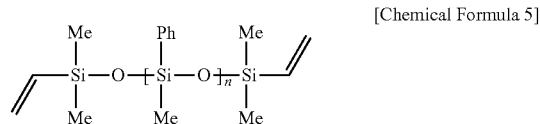

[Chemical Formula 5]

In Chemical Formula 5, Me is a methyl group and Ph is a phenyl group.

Evaluation

The hybrid siloxane polymers according to Examples 1 to 6 and the Comparative Example were heated and cured in a 150° C. oven for one hour and measured regarding initial transmittance at 450 nm. In addition, the cured resin was measured regarding how long it took for the cured resin to pass through a column using a Tack meter. The time of passing through a column is a criterion for measuring tackiness. The shorter the time taken for a product to pass through a column, the less tackiness it had.

The cured resin was allowed to stand in a 150° C. oven for 1,000 hours and again measured regarding transmittance at 450 nm. A smaller initial transmittance and transmittance difference ($\Delta_{trans}$) after the heat treatment indicates excellent heat and light resistance.

The results are provided in Table 1.

In Table 1, the coefficient of thermal expansion (CTE) was measured with a thermomechanical analysis (TMA) method. The tackiness was measured using a tack tester.

TABLE 1

| | Refractive index | Column passing time (second) | Tackiness (gf) | CTE (μm/m·°C.) | Transmittance | | |
|---|---|---|---|---|---|---|---|
| | | | | | 0 hour | 1,000 hours | $\Delta_{trans}$ |
| Example 1 | 1.53 | 22 | 12 | 115 | 99.3 | 92.4 | 6.9 |
| Example 2 | 1.54 | 30 | 15 | 130 | 99.7 | 92.5 | 7.2 |
| Example 3 | 1.54 | 26 | 14 | 128 | 99.9 | 91.5 | 8.4 |
| Example 4 | 1.54 | 34 | 16 | 141 | 99.5 | 91.2 | 8.3 |
| Example 5 | 1.54 | 24 | 13 | 120 | 99.6 | 92.5 | 7.1 |
| Example 6 | 1.54 | 30 | 16 | 134 | 99.4 | 93.2 | 6.2 |
| Comparative Example | 1.53 | 86 | 32 | 156 | 99.5 | 89.6 | 9.9 |

As shown in Table 1, the hybrid siloxane polymers according to Examples 1 to 6 exhibited similar refractive indices but low coefficients of thermal expansion and low tackiness as well as a small $\Delta_{trans}$ after the heat treatment compared with the hybrid siloxane polymer of the Comparative Example. The hybrid siloxane polymers according to Examples 1 to 6 exhibited good refractive indices and excellent heat and light resistances, but simultaneously low coefficients of thermal expansion and tackiness.

By way of summation and review, a siloxane polymer may be more desirable than an epoxy-based encapsulant, which may exhibit relatively weak heat and light resistance. However, a typical siloxane polymer may be broken or may have poor interface adherence due to a high coefficient of thermal expansion after curing. In addition, a typical siloxane copolymer encapsulant may have deteriorated workability due to high surface tackiness.

The embodiments provide a hybrid siloxane polymer that increases crack resistance (to help ensure stability of a light emitting element), decrease tackiness (to improve workability), and maintains high heat resistance and light resistance.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A hybrid siloxane polymer, comprising:
a linear first siloxane resin including moieties represented by the following Chemical Formulas 1a and 1b, the first siloxane resin including carbon-carbon double bonds at both terminal ends thereof, and
a second siloxane resin having a reticular structure,

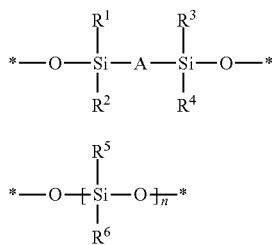

[Chemical Formula 1a]

[Chemical Formula 1b]

wherein, in Chemical Formula 1a and 1b, A is a C2 to C10 alkylene group, $R^1$ to $R^6$ are each independently a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof, and n is 1 to about 500.

2. The hybrid siloxane polymer as claimed in claim 1, wherein the second siloxane resin is represented by the following Chemical Formula 2:

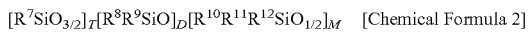   [Chemical Formula 2]

wherein, in Chemical Formula 2, $R^7$ to $R^{12}$ are each independently a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof, provided that at least one of $R^{10}$, $R^{11}$, and $R^{12}$ is the C2 to C20 alkenyl group, T>0, D≧0, M>0, and T+D+M=1.

3. The hybrid siloxane polymer as claimed in claim 2, wherein about 15% or more of $R^7$ to $R^{12}$ in Chemical Formula 2 include an aryl group.

4. The hybrid siloxane polymer as claimed in claim 1, wherein about 30% or more of $R^5$ and $R^6$ in Chemical Formula 1b include an aryl group.

5. The hybrid siloxane polymer as claimed in claim 1, wherein the first siloxane resin further includes a moiety represented by the following Chemical Formula 1c:

[Chemical Formula 1c]

wherein, in Chemical Formula 1c, Ar is a substituted or unsubstituted C6 to C20 aryl group, $R^{13}$ to $R^{16}$ are each independently a substituted or unsubstituted C1 to C10 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C10 alkoxy group, a halogen, or a combination thereof.

6. The hybrid siloxane polymer as claimed in claim 1, wherein A of the first siloxane resin is one of an ethylene group, a propylene group, a butylene group, and a pentylene group.

7. The hybrid siloxane polymer as claimed in claim 1, wherein the first siloxane resin has a number average molecular weight of about 500 to about 20,000.

8. The hybrid siloxane polymer as claimed in claim 1, wherein the first siloxane resin and the second siloxane resin are included in an amount of about 5 to about 50 wt % and about 15 to about 80 wt %, respectively, based on a total amount of the hybrid siloxane polymer.

9. The hybrid siloxane polymer as claimed in claim 1, further comprising a curing agent, the curing agent having at least two silicon-hydrogen bonds.

10. The hybrid siloxane polymer as claimed in claim 1, further comprising a hydrosilation catalyst.

11. An encapsulant obtained by curing the hybrid siloxane polymer as claimed in claim 1.

12. An electronic device comprising the encapsulant as claimed in claim 11.

13. The electronic device as claimed in claim 12, wherein the electronic device includes a light emitting diode, an organic light emitting device, photoluminescent device, or a solar cell encapsulated by the encapsulant.

* * * * *